United States Patent [19]

Belin et al.

[11] Patent Number: 4,992,085
[45] Date of Patent: Feb. 12, 1991

[54] INTERNAL IMPACT TYPE PARTICLE SEPARATOR

[75] Inventors: Felix Belin, Brecksville; David E. James, Barberton; David J. Walker, Wadsworth, all of Ohio

[73] Assignee: The Babcock & Wilcox Company, New Orleans, La.

[21] Appl. No.: 461,707

[22] Filed: Jan. 8, 1990

[51] Int. Cl.$^5$ .............................................. B01D 45/00
[52] U.S. Cl. ........................................ 55/444; 110/216
[58] Field of Search ................. 55/443, 444; 110/216, 110/245

[56] References Cited

U.S. PATENT DOCUMENTS 1,761,168  6/1930  Andrews ............................. 55/444
4,730,563  3/1988  Thornbird ......................... 110/216
4,796,546  1/1989  Herstad et al. ..................... 110/216

Primary Examiner—Charles Hart
Attorney, Agent, or Firm—Robert J. Edwards; Michael L. Hoelter

[57] ABSTRACT

An internal particle separator having impingement members positioned within the furnace enclosure across and just upstream of the furnace exit opening. These impingement members are organized into at least two staggered rows that are positioned to fully cover the exit opening thereby allowing entrained particles to strike the impingement members and free-fall directly back into the fluidized bed to increase its density. A baffle plate is attached to the lower end region of the impingement members thereby obstructing the vertical gas passage between these members.

15 Claims, 2 Drawing Sheets

INTERNAL IMPACT TYPE PARTICLE SEPARATOR

FIELD OF THE INVENTION

This invention pertains to an impact-type particle separator for circulating fluidized bed combustors and more particularly to a separator positioned within the freeboard space just upstream of the combustor exit.

BACKGROUND OF THE INVENTION

The use of impact-type particle separators to remove solid material entrained in a gas is well known. Typical examples of such particle separators are illustrated in U.S. Pat. No. 2,083,764 to Weisgerber, U.S. Pat. No. 2,163,600 to How, U.S. Pat. No. 3,759,014 to Von Dyken, II et al., U.S. Pat. No. 4,253,425 to Gamble et al., and U.S. Pat. No. 4,717,404 to Fore.

With respect to fluidized bed combustors, particle separators can be categorized as being either external or internal. External type particle separators are those located outside the furnace enclosure with typical examples being illustrated in U.S. Pat. No. 4,640,201 and 4,679,511 to Holmes et al., U.S. Pat. No. 4,672,918 to Engstrom et al., and U.S. Pat. No. 4,683,840 to Morin. Internal type particle separators are those located within the furnace enclosure and are illustrated in U.S. Pat. No. 4,532,871 and 4,589,352 to Van Gasselt et al., U.S. Pat. No. 4,699,068, 4,708,092 and 4,732,113 to Engstrom, and U.S. Pat. No. 4,730,563 to Thornblad.

These latter internal type separators either involve baffles across the entire freeboard space that would be difficult to unclog and support or they involve an internal baffle and chute arrangement which closely resembles the external type of particle separators.

It is thus an object of this invention to provide a particle separator that is located within the furnace enclosure but which does not create an obstruction in the furnace freeboard. Another object of this invention is to provide an internal-type particle separator that requires no re-configuration of the furnace enclosure or chutes for the collected particles. A further object of this invention is to increase average density of the furnace as well as solids residence time. Such increases enhance furnace heat transfer rates and improve the carbon conversion efficiency. Additionally, improved sorbent utilization occurs for greater sulfur capture without increasing external solids circulation rate. These and other objects of this invention will become obvious upon further investigation.

SUMMARY OF THE INVENTION

This invention discloses an internal impact type particle separator for circulating fluidized bed combustors. This particle separator incorporates a plurality of concave impact members supported within a furnace enclosure and extending uniformly, in at least two staggered rows, across all of and just upstream of the furnace exit opening. These adjacent impingement members also extend beyond the lower elevation of this opening thereby enabling the collected particles to fall unobstructed and unchanneled directly underneath these members to the lower part of the furnace for reentrainment and recycling thereof. The staggered rows of impingement members are spaced from each other a distance of 50% to 70% of the distance between adjacent members with one such row being spaced from the furnace enclosure or furnace exit opening a distance of not more than 15% of the depth of the concave impingement members. Preferably a baffle is attached to the lower end region of the impingement members thereby obstructing the vertical gas passage between such members.

BRIEF DESCRIPTION OF THE DRAWINGS

FIG. 1b is a schematic plan view of the illustration of FIG. 1a.

FIG. 2b is a schematic plan view of the illustration of FIG. 2a.

DETAILED DESCRIPTION OF THE INVENTION

Figure 1A:
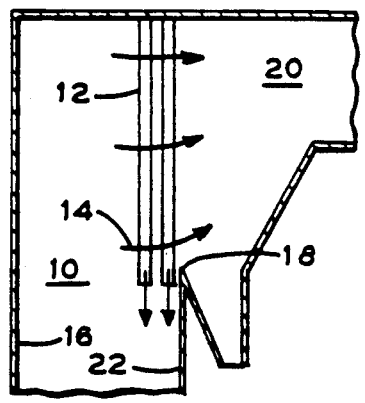
FIG. 1a is a schematic side view illustrating a portion of a circulating fluidized bed combustor and the invention.
Figure 2A:
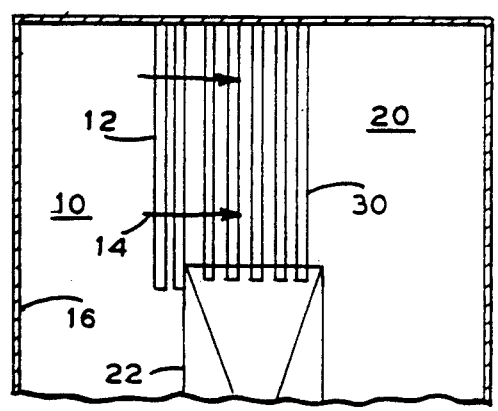
FIG. 2a is a schematic side view illustration as in FIG. 1 but further depicting a downstream external-type particle separator.
Figure 1B:
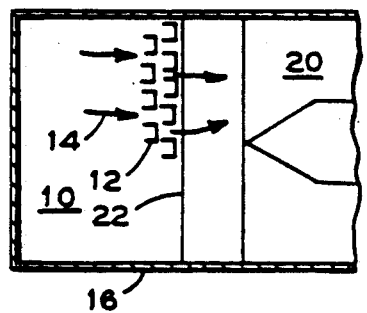
Figure 2B:
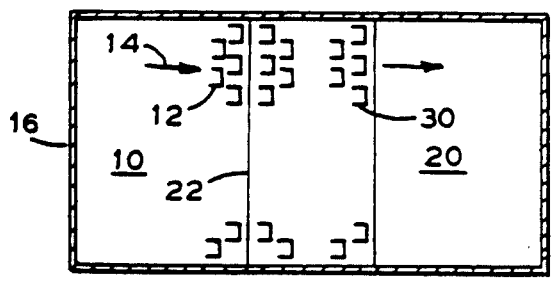
Figure 3:
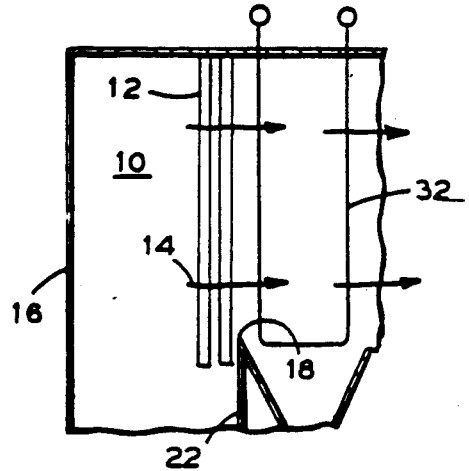
FIG. 3 is a schematic side view illustration as in FIG. 1 but further depicting a downstream convection heating surface.

Referring initially to FIGS. 1, 2, and 3, there is shown a portion of circulating fluidized bed combustor 10. As shown, combustor 10 is outfitted with at least one but preferably two or more rows of impingement members 12 supported from the roof or ceiling of combustor 10. These impingement members 12 may be used as a first stage separator followed by flue gas pass 20 connecting it with other separators or heat surfaces as in FIG. 1, with other downstream impingement members 30 as in FIG. 2, or in conjunction with convection heating surface 32 in the downstream pass as in FIG. 3.

In any event, impingement members 12 are non-planar; they may be U-shaped, E-shaped, W-shaped or any other shape as long as they have a concave surface. The two rows of members 12 are staggered such that flue gas 14 passes through them enabling the entrained solid particles to strike this concave surface. Subsequently, these collected particles will free fall downward against the crossing flow of flue gas 14.

Impingement members 12 are positioned within furnace enclosure 16 fully across and just upstream of furnace exit opening 18. Exit opening 18 encompasses not less than 70% of the width of the combustor wall, and ideally, exit opening 18 extends all the way across its width with impingement members 12 doing the same. Besides covering exit opening 18, each impingement member 12 also extends beyond the lower elevation of exit opening 18 by approximately one foot. In this fashion, as flue gas 14 exits furnace enclosure 16, it must first pass through impingement members 12 as shown just upstream of exit opening 18. Preferably, a flue gas pass 20 downstream of exit opening 18 is arranged so that no substantial change in the flow direction of flue gas 14 occurs nor is there a reduction in size of flue gas pass 20 immediately downstream exit opening 18. In the preferred embodiment, no such duct size or direction change is made within the distance from exit opening 18 equal to: (1) if measured vertically, 25% of the length of impingement members 12; or, (2) if measured horizontally, 25% of the exit opening width.

Figure 4:
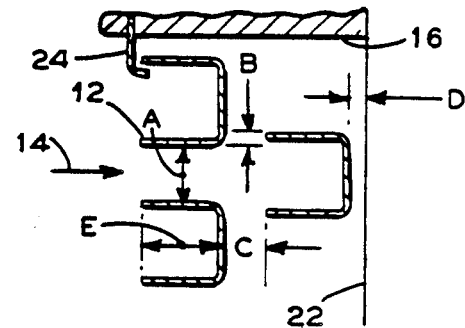
FIG. 4 is a schematic plan view illustrating a portion of the impingement members and their location within the furnace enclosure.

Referring now more specifically to FIG. 4, the spacing of each impingement member 12 within furnace enclosure 16 is shown. Reference 'A' is the spacing between adjacent members 12. Reference 'B' is the overlap of one member 12 in a row over the spacing 'A' in the adjacent row. Generally 'B' is from 5% to 15% of spacing 'A'. Reference 'C' is the distance between adjacent rows with this value generally being from 50% to 75% of spacing 'A'. Reference 'D' is the gap between the back row and furnace rear wall 22. Gap 'D' is usually 15% or less of the concavity of impingement member 12 so as to reduce by-passing. This concavity is referred to as distance 'E'.

L-shaped baffles 24 are secured to furnace enclosure 16 adjacent the end of each row of impingement members 12. Each baffle 24 extends along the length of its respective member 12 to also prevent flue gas 14 from by-passing members 12 along furnace enclosure 16.

Figure 5:
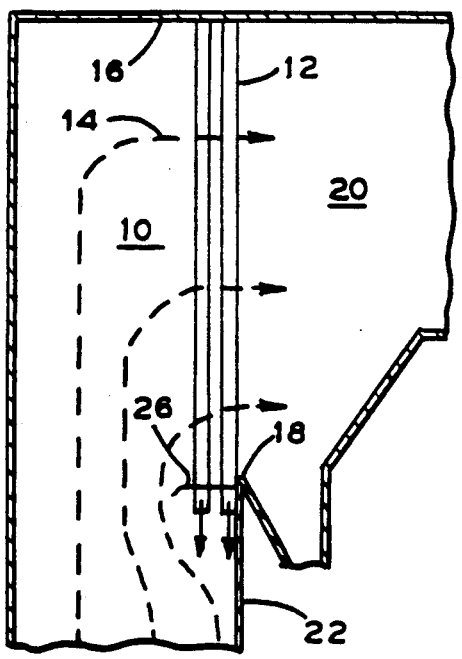
FIG. 5 is a schematic side view illustrating the invention with a horizontal baffle plate.
Figure 6:
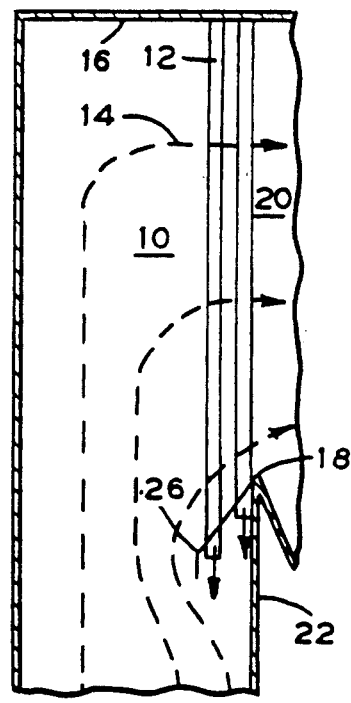
FIG. 6 is a schematic side view illustrating the invention with an angled baffle plate.
Figure 7:
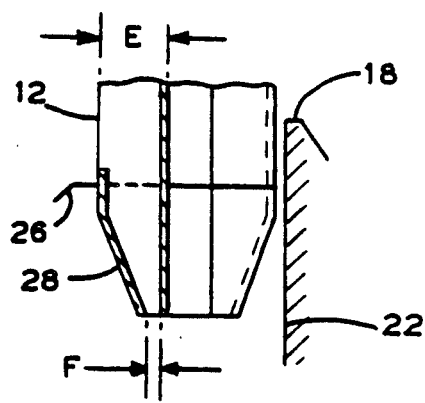
FIG. 7 is a schematic side view of funneled impingement members.

In an alternate embodiment, and as illustrated in FIGS. 5, 6, and 7, a baffle 26 is added near the bottom of impingement members 12. This baffle 26 is positioned below the lower elevation of exit opening 18 and it may either be horizontal (FIG. 5) or angled downward from opening 18 (FIG. 6). In either case, baffle 26 causes flue gas 14 to flow across impingement members 12 as shown thereby preventing any of it from flowing directly upward along an impingement member 12 and into flue gas pass 20.

Of course, the collected particles are allowed to continue to flow downward along the impingement members 12 and through small openings in baffle 26. In this fashion and in view of the new flow path of flue gas 14, the recycled particles that flow downward along furnace wall 22 will meet with less reentrainment from the upwardly flowing flue gas 14.

So as not to allow gas short-cutting, baffle 26 is configured to cover the flow area between the individual impingement members 12 but not the concave area within each individual member 12. Also, the angled or inclined baffle 26 prevents any solids from accumulating on it.

Preferably the end of impingement member 12 is between 4 and 12 inches below baffle 26, and baffle 26 is oftentimes flanged at its periphery for greater rigidity. Also, with baffle plate 26, a gap between the baffle plate and adjacent walls is preferably not more than ¼ inch.

FIG. 7 illustrates an impingement member 12 having a funneled end 28 that provides for even less of an opening through which upwardly flowing flue gas 14 may travel. Another function of funneled end 28 is to divert the separated solids away from furnace wall 22 to avoid local wall erosion near the discharge. The opening "F" of funneled end 28 is preferably one half of "E" but in any event, not less then 2.5 inches.

In the preferred embodiment, the length, width, number, configuration, and spacing of members 12 are selected for a flue gas 14 velocity across the impingement members of preferably 6 to 8 meters per second but not greater than 10 meters per second for the embodiment without baffle 26 and not greater than 13 meters per second for the embodiment with baffle 26. These numbers were determined from testing various U-beam type internal impingement separators using a wide range of gas velocities. Generally, lower flue gas velocity in the separator correlates to higher collection efficiency but requires longer impingement members 12. A value of 6 to 8 meters/second was found to minimize particle entrainment by flue gas 14 while permitting an acceptable length of impingement members 12 for commercial size combustors.

During operation, members 12 discharge their collected solids along the bottom of each member. The discharged solids then free-fall along adjacent furnace wall 22 directly back to the lower part of the fluidized bed thereby increasing the bed average density and particle residence time. No additional channeling or baffling or other obstruction in the furnace freeboard is required to return these particles back to the bed.

In a test of the embodiment without the baffle plates, it was found that one row of impingement members 12 doubles the average bed density while two such rows nearly quadrupled the density. Thus, it is recommended that there be at least two rows of impingement members 12. Also, tests have shown that the inclusion of baffle 26 increased bed density about three times over the same arrangement without baffle 26. This enhanced density increases the average heat transfer rate which corresponds to a reduction of the heat transfer surface requirements and its associated cost. Additionally, higher bed densities increase the particle residence time in the bed thereby improving the carbon conversion efficiency and the sorbent utilization for sulfur capture. It also promotes a higher temperature uniformity in combustor 10 while permitting optimal temperatures for sulfur capture reactions to be maintained throughout the combustor.

Another advantage of these rows of impingement members 12 installed internally in combustor 10 upstream of a secondary separator is that for a given average furnace density they reduce the carryover of coarser bed particles to flue gas pass 20. This reduces the potential for tube erosion in that pass and allows for increased concentrations of fine char and sorbent particles to be collected by external or secondary particle collectors which are then recycled back to the combustor.

What is claimed as invention is:

1. An internal impact type particle separator for a circulating fluidized bed combustor comprising a plurality of concave impingement members supported within a furnace enclosure, said members extending uniformly in at least two staggered rows fully across and just upstream of a furnace exit opening, said members also extending along the length of said opening and terminating at a location below the lower elevation of said exit opening with collected particles falling unobstructed and unchanneled directly underneath said members and along one wall of said furnace enclosure for reentrainment and recycling thereof, said staggered rows being spaced from each other a distance of at least 50% of the distance between adjacent said members with one said row being spaced from said furnace wall a distance less than the depth of a said concave impingement member.

2. The apparatus as set forth in claim 1 wherein the members of a said row overlap the members of an adjacent said row a distance of from 5% to 15% of the spacing between adjacent said members in a said row.

3. The apparatus as set forth in claim 2 wherein said staggered rows are spaced from each other a distance of from 50% to 70% of the spacing between adjacent said members in a said row.

4. The apparatus as set forth in claim 3 wherein the distance between said one wall of said furnace enclosure and an adjacent said row of said members is less than 15% of the depth of said concave impingement members.

5. The apparatus as set forth in claim 4 wherein the gas pass downstream of said exit opening is configured so that: (1) no vertical change in flue gas flow direction or flue gas pass size occurs within a distance from said exit opening equal to 25% of the length of said impingement members; and, (2) no horizontal change in flue gas flow direction or flue gas pass size occurs within a distance from said exit opening equal to 25% of the width of said exit opening.

6. The apparatus as set forth in claim 5 further comprising an elongated L-baffle secured on opposite side walls of said enclosure adjacent the ends of each said row for preventing flue gas bypassing along the walls of said furnace enclosure.

7. The apparatus as set forth in claim 6 wherein said impingement members extend below the lower elevation of said exit opening by approximately one foot.

8. The apparatus as set forth in claim 7 further comprising a baffle plate attached to the lower end region of said impingement members below the lower elevation of said furnace exit opening with said baffle plate obstructing the vertical passage of gas between said impingement members.

9. The apparatus as set forth in claim 8 wherein said baffle plate is horizontal.

10. The apparatus as set forth in claim 8 wherein said baffle plate is angled with respect to said impingement members.

11. The apparatus as set forth in claim 8 wherein said baffle plate is spaced not more than $\frac{1}{4}$ inch from said furnace enclosure to prevent flue gas bypassing.

12. The apparatus as set forth in claim 11 wherein said baffle plate is located between 4 and 12 inches from the lower end of said impingement members.

13. The apparatus as set forth in claim 12 wherein the discharge end of each said impingement member underneath said baffle plate is funnel-shaped.

14. The apparatus as set forth in claim 7 wherein said furnace exit opening width encompasses not less than 70% of the width of said one wall of said furnace enclosure.

15. The apparatus as set forth in claim 7 wherein said impingement members are U-shaped, E-shaped, W-shaped or of some other similar concave configuration.

* * * * *